US011496872B2

(12) United States Patent
Rico Alvarino et al.

(10) Patent No.: US 11,496,872 B2
(45) Date of Patent: Nov. 8, 2022

(54) SEARCH SPACES AND GRANTS IN EMTC

(71) Applicant: QUALCOMM Incorporated, San Diego, CA (US)

(72) Inventors: Alberto Rico Alvarino, San Diego, CA (US); Wanshi Chen, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 15/269,037

(22) Filed: Sep. 19, 2016

(65) Prior Publication Data

US 2017/0134880 A1   May 11, 2017

Related U.S. Application Data

(60) Provisional application No. 62/252,268, filed on Nov. 6, 2015.

(51) Int. Cl.
| | |
|---|---|
| *H04W 4/70* | (2018.01) |
| *H04L 5/00* | (2006.01) |
| *H04W 72/04* | (2009.01) |
| *H04W 88/02* | (2009.01) |

(52) U.S. Cl.
CPC ............ *H04W 4/70* (2018.02); *H04L 5/0007* (2013.01); *H04L 5/0053* (2013.01); *H04W 72/044* (2013.01); *H04L 5/0042* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 9,131,457 B2 * | 9/2015 | Nam | ............... H04L 5/0005 |
| 9,736,829 B2 | 8/2017 | Chen et al. | |
| 2011/0269442 A1 | 11/2011 | Han et al. | |
| 2012/0182950 A1 * | 7/2012 | Chung | ............... H04L 5/0053 |
| | | | 370/329 |

(Continued)

FOREIGN PATENT DOCUMENTS

| | | |
|---|---|---|
| CN | 101932024 A | 12/2010 |
| CN | 102104866 A | 6/2011 |

(Continued)

OTHER PUBLICATIONS

Liu, Renmao et al., machine translation of Chinese patent application CN106160978A, filed Apr. 10, 2015. (Year: 2015).*

(Continued)

*Primary Examiner* — Faruk Hamza
*Assistant Examiner* — Cassandra L Decker
(74) *Attorney, Agent, or Firm* — Qualcomm Incorporated

(57) ABSTRACT

Design of search spaces and grants in enhanced machine-type communication (eMTC) is discussed in which the search space for common control information is determined based on the search space for non-common control information. In addition, the monitoring of search spaces by mobile devices is also discussed. Additionally, communication schemes between base stations and mobile devices in which information is provided in multiple transmission modes is also discussed. Other aspects discuss schemes for the transmission of control information.

16 Claims, 11 Drawing Sheets

(56) References Cited

U.S. PATENT DOCUMENTS

| | | | |
|---|---|---|---|
| 2013/0021989 A1* | 1/2013 | Tiirola | H04L 5/0053 370/329 |
| 2013/0127453 A1 | 5/2013 | Ausserlechner | |
| 2013/0242750 A1 | 9/2013 | Baker et al. | |
| 2014/0098761 A1* | 4/2014 | Lee | H04W 74/006 370/329 |
| 2014/0169313 A1* | 6/2014 | Yang | H04L 69/324 370/329 |
| 2014/0185540 A1 | 7/2014 | Gaal et al. | |
| 2014/0211747 A1 | 7/2014 | Takeda et al. | |
| 2014/0233470 A1* | 8/2014 | Kim | H04L 5/0053 370/329 |
| 2014/0286277 A1 | 9/2014 | Jang et al. | |
| 2014/0301330 A1 | 10/2014 | Lee et al. | |
| 2014/0301341 A1* | 10/2014 | Pan | H04L 1/0026 370/329 |
| 2014/0307693 A1* | 10/2014 | Feng | H04L 27/2602 370/329 |
| 2015/0049704 A1* | 2/2015 | Park | H04L 5/0048 370/329 |
| 2015/0189633 A1 | 7/2015 | Oizumi et al. | |
| 2015/0230215 A1 | 8/2015 | Ye et al. | |
| 2016/0014802 A1* | 1/2016 | Yang | H04L 5/001 370/329 |
| 2016/0183112 A1 | 6/2016 | Yang et al. | |
| 2016/0302174 A1* | 10/2016 | Chatterjee | H04B 7/0486 |
| 2017/0230994 A1* | 8/2017 | You | H04W 72/042 |
| 2017/0237586 A1* | 8/2017 | Liu | H04L 25/03866 370/329 |
| 2017/0279646 A1* | 9/2017 | Yi | H04L 5/0053 |
| 2017/0303247 A1 | 10/2017 | Yasukawa et al. | |
| 2017/0374570 A1* | 12/2017 | Yi | H04L 1/08 |
| 2017/0374653 A1* | 12/2017 | Lee | H04W 48/16 |
| 2018/0103459 A1* | 4/2018 | Liu | H04W 72/042 |
| 2018/0192354 A1* | 7/2018 | Yi | H04L 5/0094 |
| 2018/0279101 A1 | 9/2018 | Rico et al. | |
| 2018/0279268 A1 | 9/2018 | You et al. | |
| 2018/0288779 A1* | 10/2018 | Dai | H04L 1/1812 |

FOREIGN PATENT DOCUMENTS

| | | | |
|---|---|---|---|
| CN | 104012061 A | | 8/2014 |
| CN | 106160978 A * | | 11/2016 ........... H04L 5/0057 |
| EP | 2723009 A2 | | 4/2014 |
| EP | 2763343 A1 | | 8/2014 |
| GB | 2522482 A | | 7/2015 |
| JP | 2015501595 A | | 1/2015 |
| JP | 2015502698 A | | 1/2015 |
| JP | 2015095668 A | | 5/2015 |
| WO | WO-2013127453 A1 | | 9/2013 |
| WO | 2014107611 A2 | | 7/2014 |
| WO | 2015057367 A1 | | 4/2015 |

OTHER PUBLICATIONS

Samsung, R1-103032: DL transmission modes for Rel-10, 3GPP TSG RAN WT1 #61, Montreal, Canada, May 10-14, 2010. (Year: 2010).*

Ericsson: "Search Space Configuration for M-PDCCH", 3GPP Draft, R1-155027 Search Space Configuration for M-PDCCH, 3rd Generation Partnership Project (3GPP), Mobile Competence Centre, 650, Route Des Lucioles, F-96921 Sophia-Antipolis Cedex, France, vol. RAN WG1, No. Malmo, Sweden, Oct. 5, 2015-Oct. 9, 2015, Oct. 4, 2015 (Oct. 4, 2015), XP051002028, Retrieved from the Internet: URL: http://www.3gpp.org/ftp/Meetings_3GPP_SYNC/RAN1/Docs/.

International Search Report and Written Opinion—PCT/US2016/052617—ISA/EPO—dated Apr. 5, 2017.

Panasonic: "Search Spaces during eMTC Random Access Procedure", 3GPP Draft; R1-155769, 3rd Generation Partnership Project (3GPP), Mobile Competence Centre ; 650, Route Des Lucioles ; F-06921 Sophia-Antipolis Cedex; France, vol. RAN WG1, No. Malme, Sweden; Oct. 5, 2015-Oct. 9, 2015, Oct. 4, 2015 (Oct. 4, 2015), XP051039749, 4 pages. Retrieved from the Internet: URL: http://www.3gpp.org/ftp/Meetings_3GPP/SVNC/RAN1/Docs/ [retrieved on Oct. 4, 2015].

Partial International Search Report—PCT/US2016/052617—ISA/EPO—dated Nov. 28, 2016.

Taiwan Search Report—TW105130369—TIPO—dated Jul. 6, 2020.

European Search Report—EP20187966—Search Authority—Munich—dated Oct. 7, 2020.

QUALCOMM et al., "WF on MPDCCH Candidates" [online], 3GPP TSG RAN WG1 Meeting #82bis, R1-156193, Oct. 7, 2015, pp. 1-3, Retrieved from the Internet: URL: https://www.3gpp.org/ftp/TSG_RAN/WG1_RL1/TSGR1_82b/Docs/R1-156193.zip.

Samsung: "CSS for M-PDCCH" [online], 3GPP TSG RAN WG1 #82, R1-154096, Aug. 14, 2015, pp. 1-4, Retrieved from the Internet: URL:https://www.3gpp.org/ftp/tsg_ran/WG1_RL1/TSGR1_82/Docs/R1-154096.zip.

ZTE: "Detailed Design on Physical Downlink Control Channel for MTC Enhancement" [online], 3GPP TSG RAN WG1 Meeting #80bis, R1-151728, Apr. 11, 2015, pp. 1-8, Retrieved from the Internet: URL: https://www.3gpp.org/ftp/TSG_RAN/WG1_RL1/TSGR1_80b/Docs/R1-151728.zip.

* cited by examiner

… (1) …

SEARCH SPACES AND GRANTS IN EMTC

CROSS-REFERENCE TO RELATED APPLICATIONS

This application claims the benefit of U.S. Provisional Patent Application No. 62/252,268, entitled, "DESIGN OF SEARCH SPACES AND GRANTS IN EMTC," filed on Nov. 6, 2015, which is expressly incorporated by reference herein in its entirety.

BACKGROUND

Field

Aspects of the present disclosure relate generally to wireless communication systems and, more particularly, to the design of search spaces and grants to improve machine type communication (MTC) in wireless communication systems.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continues to advance the UMTS technologies.

In particular, conventional UEs, such as mobile devices, are optimized for human use. For example, conventional UEs are optimized to provide data at high rates with large bandwidth. However, machines do not require such high performance or consumption, thus communication for machines can be optimized to achieve other goals. More specifically, whereas performance tends to be the driving factor to be optimized when the UE is developed for use by humans, other factors, such as battery life, cost, and coverage efficiency, can be optimized when the UE is developed for use by machines.

SUMMARY

In one aspect of the disclosure, a method of wireless communication includes identifying, by a processor, a first search space configuration for a first search space; setting, by the processor, a second search space configuration for a second search space based, at least in part, on the first search space configuration; and transmitting, by the processor, control information to a mobile device in at least one of the first search space and the second search space.

In an additional aspect of the disclosure, an apparatus configured for wireless communication includes means for identifying, by a processor, a first search space configuration for a first search space; means for setting, by the processor, a second search space configuration for a second search space based, at least in part, on the first search space configuration; and means for transmitting, by the processor, control information to a mobile device in at least one of the first search space and the second search space.

In an additional aspect of the disclosure, a computer program product has a computer-readable medium having program code recorded thereon. This program code includes code for causing a computer to identify a first search space configuration for a first search space, set a second search space configuration for a second search space based, at least in part, on the first search space configuration, and transmit control information to a mobile device in at least one of the first search space and the second search space.

In an additional aspect of the disclosure, an apparatus includes at least one processor and a memory coupled to the processor. The processor is configured to identify a first search space configuration for a first search space, set a second search space configuration for a second search space based, at least in part, on the first search space configuration, and transmit control information to a mobile device in at least one of the first search space and the second search space.

In one aspect of the disclosure, a method of wireless communication includes identifying, by a processor, a first search space; identifying, by the processor, a second search space; and monitoring, by the processor, the first search space and the second search space based on a time-division multiplexed pattern.

In an additional aspect of the disclosure, an apparatus configured for wireless communication includes means for identifying, by a processor, a first search space; means for identifying, by the processor, a second search space; and means for monitoring, by the processor, the first search space and the second search space based on a time-division multiplexed pattern.

In an additional aspect of the disclosure, a computer program product has a computer-readable medium having program code recorded thereon. This program code includes code for causing a computer to identify, by a processor, a first search space, identify, by the processor, a second search space, and monitor, by the processor, the first search space and the second search space based on a time-division multiplexed pattern.

In an additional aspect of the disclosure, an apparatus includes at least one processor and a memory coupled to the processor. The processor is configured to identify a first search space, identify a second search space, and monitor the first search space and the second search space based on a time-division multiplexed pattern.

In one aspect of the disclosure, a method of wireless communication includes setting, by a processor, a first search space configuration for a first search space and a second search space configuration for a second search space based, at least in part, on a transmission power required by a mobile device for reception, wherein the first search space comprises one or more locations where unicast control information may be retrieved by the mobile device, and wherein the second search space comprises one or more locations where control information for more than one mobile device may be retrieved by the mobile device; and transmitting, by the processor, control information to the mobile device in at least one of the first search space and the second search space.

In an additional aspect of the disclosure, an apparatus configured for wireless communication includes means for setting, by a processor, a first search space configuration for a first search space and a second search space configuration for a second search space based, at least in part, on a transmission power required by a mobile device for reception, wherein the first search space comprises one or more locations where unicast control information may be retrieved by the mobile device, and wherein the second search space comprises one or more locations where control information for more than one mobile device may be retrieved by the mobile device; and means for transmitting, by the processor, control information to the mobile device in at least one of the first search space and the second search space.

In an additional aspect of the disclosure, a computer program product has a computer-readable medium having program code recorded thereon. This program code includes code for causing a computer to set a first search space configuration for a first search space and a second search space configuration for a second search space based, at least in part, on a transmission power required by a mobile device for reception, wherein the first search space comprises one or more locations where unicast control information may be retrieved by the mobile device, and wherein the second search space comprises one or more locations where control information for more than one mobile device may be retrieved by the mobile device, and transmit control information to the mobile device in at least one of the first search space and the second search space.

In an additional aspect of the disclosure, an apparatus includes at least one processor and a memory coupled to the processor. The processor is configured to set a first search space configuration for a first search space and a second search space configuration for a second search space based, at least in part, on a transmission power required by a mobile device for reception, wherein the first search space comprises one or more locations where unicast control information may be retrieved by the mobile device, and wherein the second search space comprises one or more locations where control information for more than one mobile device may be retrieved by the mobile device, and transmit control information to the mobile device in at least one of the first search space and the second search space.

In one aspect of the disclosure, a method of wireless communication includes configuring a mobile device to receive a message in accordance with a first transmission mode; receiving a first message in accordance with the first transmission mode; and receiving a second message that includes information to process in collaboration with information received in the first message, wherein a message received in accordance with a second transmission mode includes the information received in the first message and the information received in the second message.

In an additional aspect of the disclosure, an apparatus configured for wireless communication includes means for configuring a mobile device to receive a message in accordance with a first transmission mode; means for receiving a first message in accordance with the first transmission mode; and means for receiving a second message that includes information to process in collaboration with information received in the first message, wherein a message received in accordance with a second transmission mode includes the information received in the first message and the information received in the second message.

In an additional aspect of the disclosure, a computer program product has a computer-readable medium having program code recorded thereon. This program code includes code for causing a computer to configure a mobile device to receive a message in accordance with a first transmission mode, receive a first message in accordance with the first transmission mode, and receive a second message that includes information to process in collaboration with information received in the first message, wherein a message received in accordance with a second transmission mode includes the information received in the first message and the information received in the second message.

In an additional aspect of the disclosure, an apparatus includes at least one processor and a memory coupled to the processor. The processor is configured to configure a mobile device to receive a message in accordance with a first transmission mode, receive a first message in accordance with the first transmission mode, and receive a second message that includes information to process in collaboration with information received in the first message, wherein a message received in accordance with a second transmission mode includes the information received in the first message and the information received in the second message.

In one aspect of the disclosure, a method of wireless communication includes transmitting, by a mobile device, a message indicating the mobile device's capability to receive messages in accordance with a first or second transmission mode; configuring the mobile device to receive a message in accordance with the first transmission mode and to receive a message in accordance with the second transmission mode; determining whether a message in a communication channel is associated with the first transmission mode or the second transmission mode; and receiving the message and processing the received message based on the determination of whether the message is associated with the first transmission mode or the second transmission mode.

In an additional aspect of the disclosure, an apparatus configured for wireless communication includes means for transmitting, by a mobile device, a message indicating the mobile device's capability to receive messages in accordance with a first or second transmission mode; means for configuring the mobile device to receive a message in accordance with the first transmission mode and to receive a message in accordance with the second transmission mode; means for determining whether a message in a communication channel is associated with the first transmission mode or the second transmission mode; and means for receiving the message and processing the received message based on the determination of whether the message is associated with the first transmission mode or the second transmission mode.

In an additional aspect of the disclosure, a computer program product has a computer-readable medium having program code recorded thereon. This program code includes code for causing a computer to transmit a message indicating the mobile device's capability to receive messages in accordance with a first or second transmission mode, configure the mobile device to receive a message in accordance with the first transmission mode and to receive a message in accordance with the second transmission mode, determine whether a message in a communication channel is associated with the first transmission mode or the second transmission mode, and receive the message and processing the received message based on the determination of whether the message is associated with the first transmission mode or the second transmission mode.

In an additional aspect of the disclosure, an apparatus includes at least one processor and a memory coupled to the processor. The processor is configured to transmit a message indicating the mobile device's capability to receive messages in accordance with a first or second transmission mode, configure the mobile device to receive a message in accordance with the first transmission mode and to receive a message in accordance with the second transmission mode, determine whether a message in a communication channel is associated with the first transmission mode or the second transmission mode, and receive the message and processing the received message based on the determination of whether the message is associated with the first transmission mode or the second transmission mode.

In one aspect of the disclosure, a method of wireless communication includes configuring the mobile device to receive a message in accordance with the first transmission mode and to receive a message in accordance with the second transmission mode; monitoring a communication channel for messages associated with the second transmission mode; determining when a first time interval has elapsed during which there existed no message associated with the second transmission mode; and monitoring the communication channel for messages associated with the first transmission mode upon determining that the first time interval has elapsed.

In an additional aspect of the disclosure, an apparatus configured for wireless communication includes means for configuring the mobile device to receive a message in accordance with the first transmission mode and to receive a message in accordance with the second transmission mode; means for monitoring a communication channel for messages associated with the second transmission mode; means for determining when a first time interval has elapsed during which there existed no message associated with the second transmission mode; and means for monitoring the communication channel for messages associated with the first transmission mode upon determining that the first time interval has elapsed.

In an additional aspect of the disclosure, a computer program product has a computer-readable medium having program code recorded thereon. This program code includes code for causing a computer to configure the mobile device to receive a message in accordance with the first transmission mode and to receive a message in accordance with the second transmission mode, monitor a communication channel for messages associated with the second transmission mode, determine when a first time interval has elapsed during which there existed no message associated with the second transmission mode, and monitor the communication channel for messages associated with the first transmission mode upon determining that the first time interval has elapsed.

In an additional aspect of the disclosure, an apparatus includes at least one processor and a memory coupled to the processor. The processor is configured to configure the mobile device to receive a message in accordance with the first transmission mode and to receive a message in accordance with the second transmission mode, monitor a communication channel for messages associated with the second transmission mode, determine when a first time interval has elapsed during which there existed no message associated with the second transmission mode, and monitor the communication channel for messages associated with the first transmission mode upon determining that the first time interval has elapsed.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
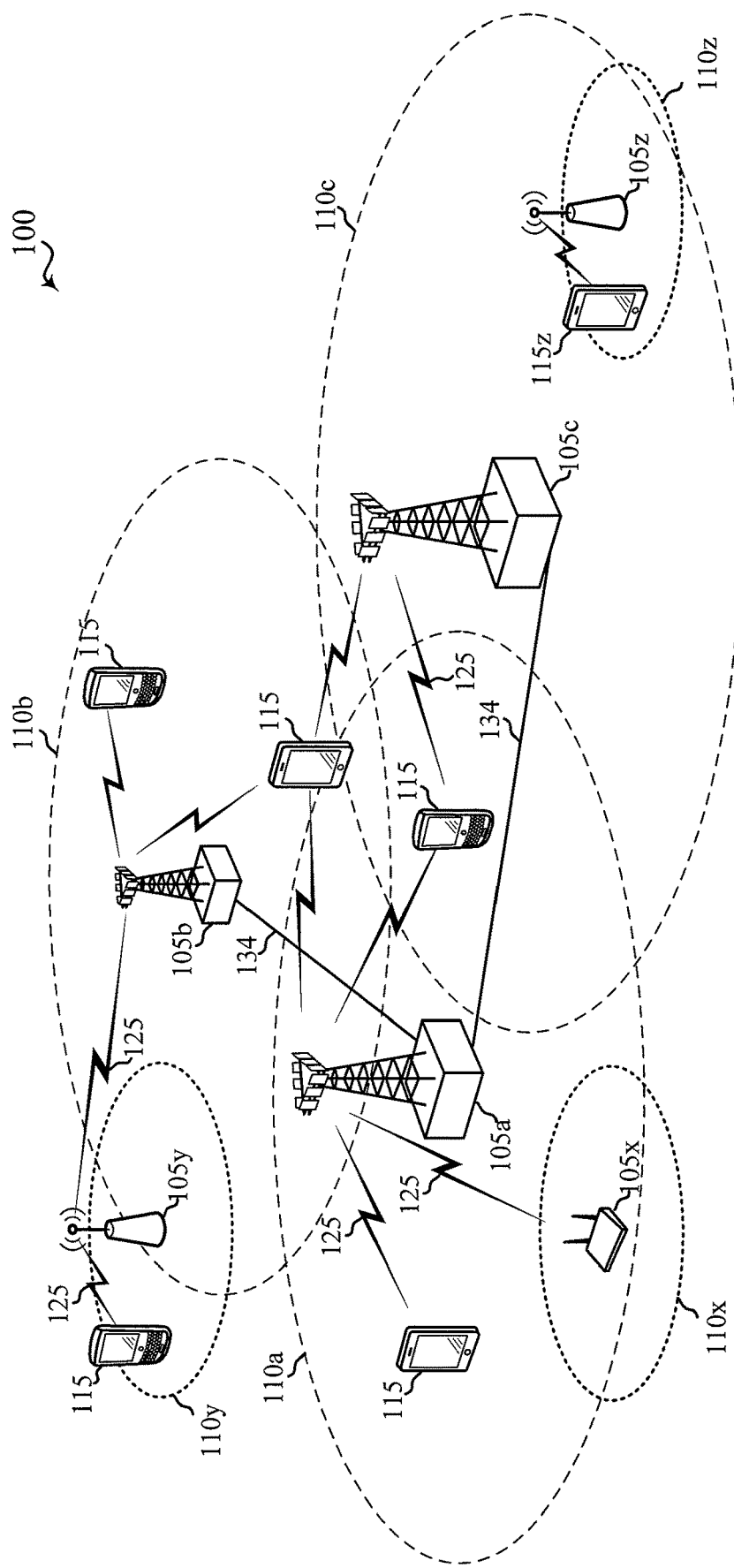
FIG. 1 is a diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted herein as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communications 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
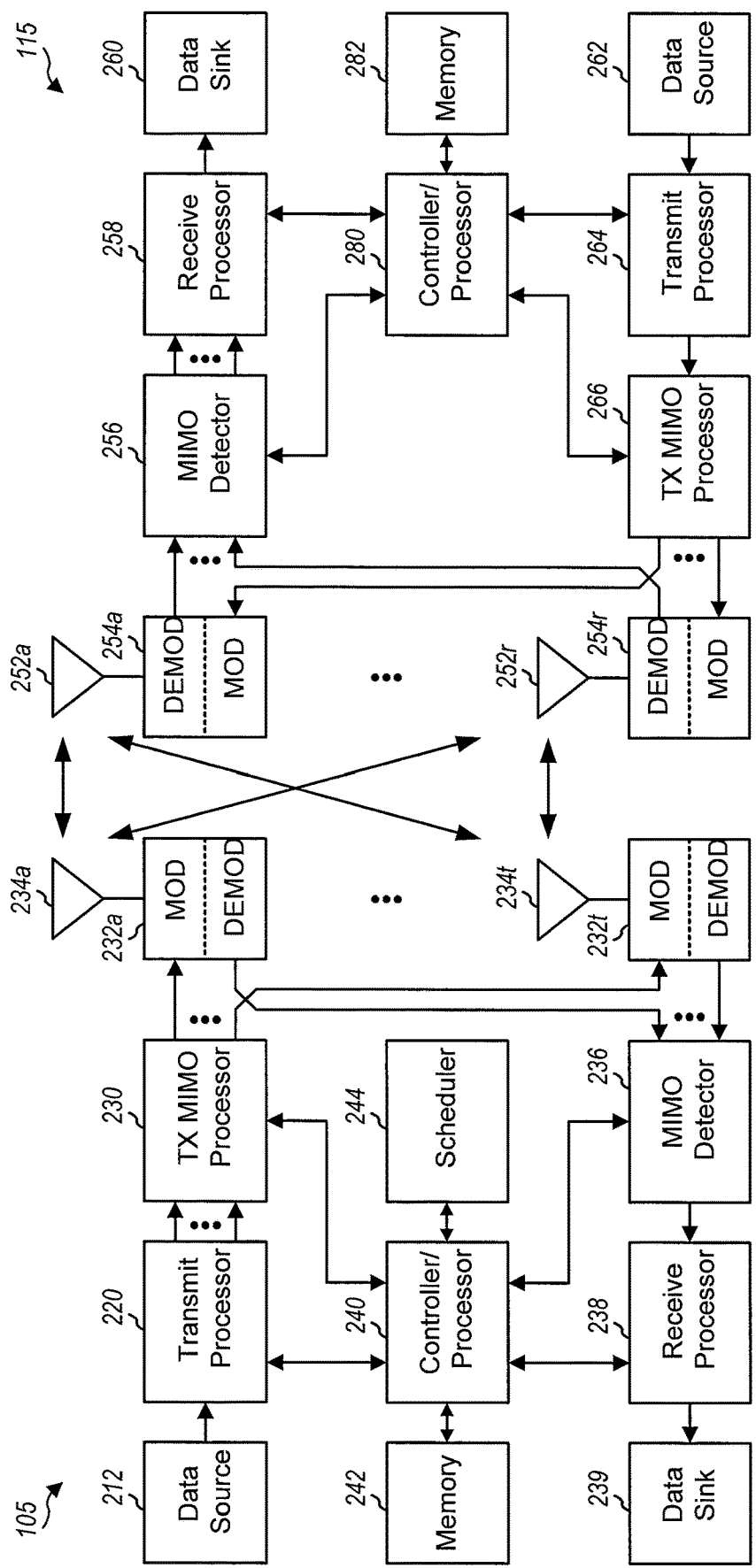
FIG. 2 is a diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of various processes for the techniques described herein. The memories 242 and 282 may store data and program codes for the eNB 105 and the UE 115, respectively. A scheduler 244 may schedule UEs for data transmission on the downlink and/or uplink.

Figure 3:
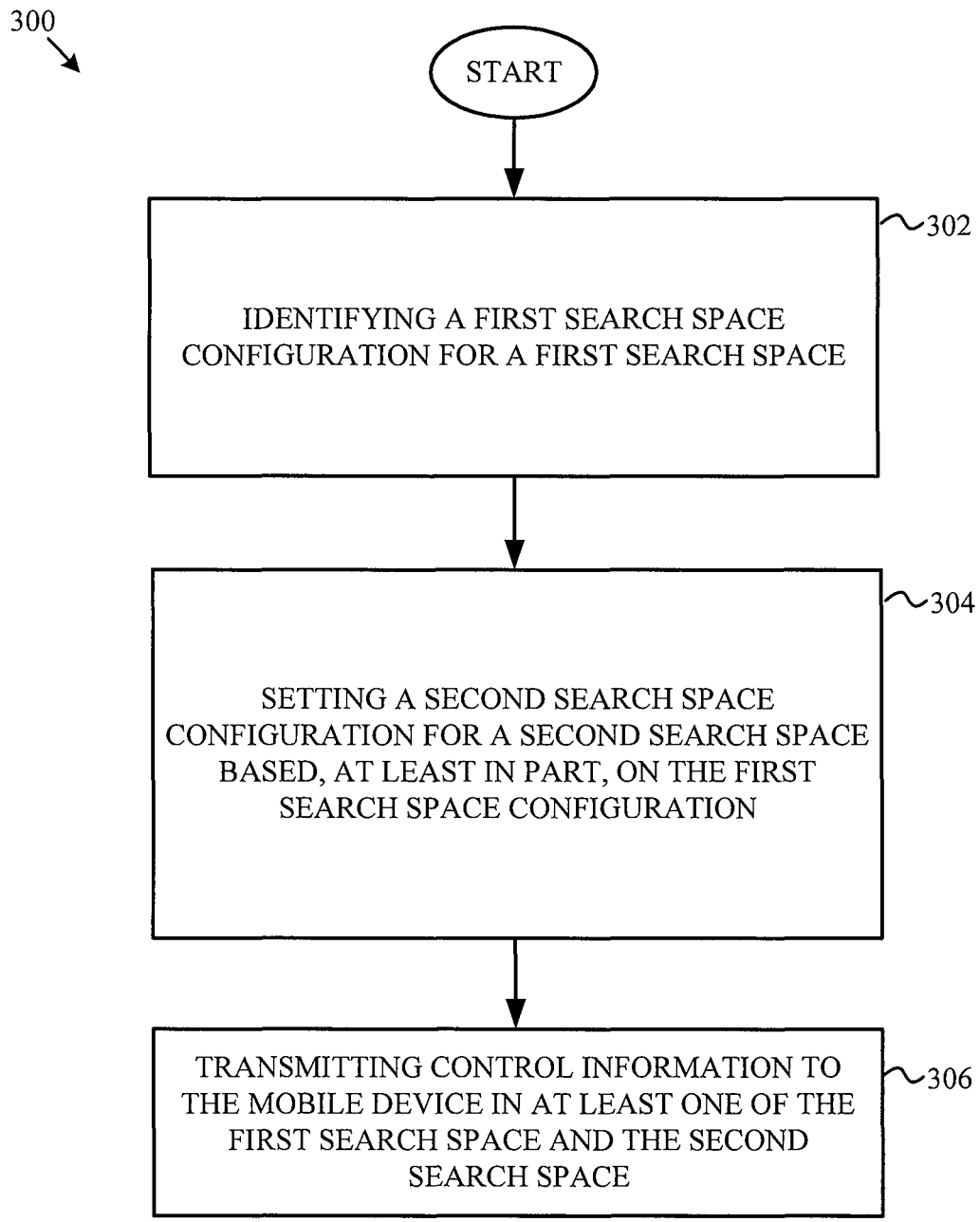
FIG. 3 is a block diagram illustrating a method for setting a second search space according to one aspect of the present disclosure.
Figure 10:
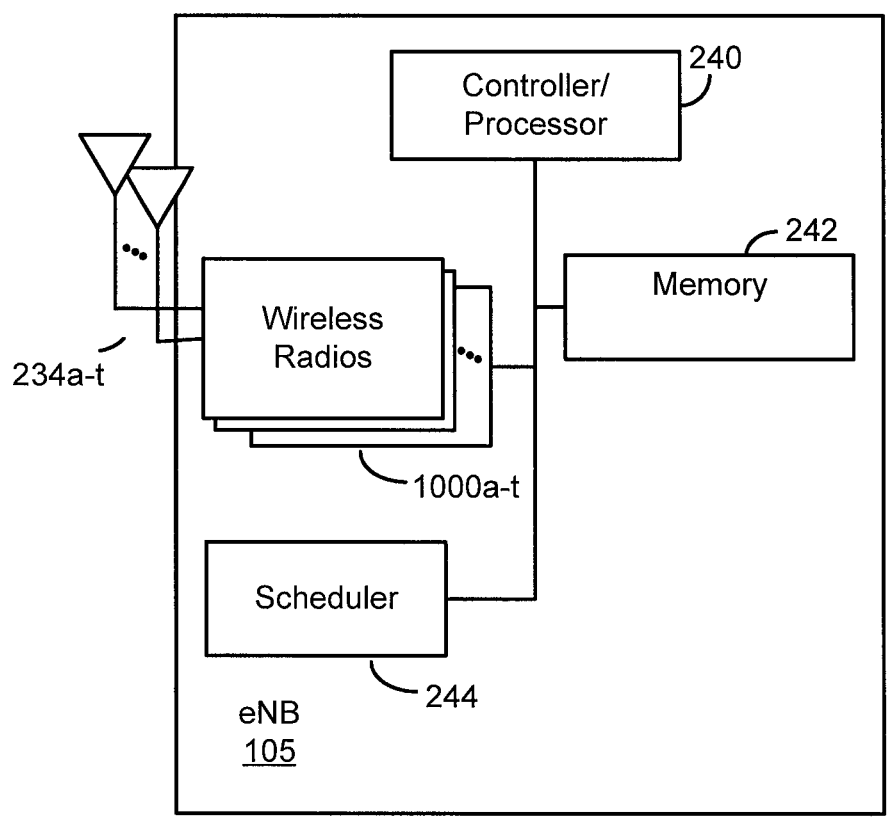
FIG. 10 is a block diagram illustrating an eNB configured according to one aspect of the present disclosure.

FIG. 3 is a block diagram illustrating a method for setting a second search space according to one aspect of the present disclosure. Aspects of method 300 may be implemented with the aspects of this disclosure described with respect to FIGS. 1-2 and 10-11, such as a base station. The example blocks will also be described with respect to eNB 105 as illustrated in FIG. 10. FIG. 10 is a block diagram illustrating eNB 105 configured according to one aspect of the present disclosure. eNB 105 includes the structure, hardware, and components as illustrated for eNB 105 of FIG. 2. For example, eNB 105 includes controller/processor 240, which operates to execute logic or computer instructions stored in memory 242, as well as controlling the components of eNB 105 that provide the features and functionality of eNB 105. eNB 105, under control of controller/processor 240, transmits and receives signals via wireless radios 1000a-t and antennas 234a-t. Wireless radios 1000a-t includes various components and hardware, as illustrated in FIG. 2 for eNB 105, including modulator/demodulators 232a-t, MIMO detector 236, receive processor 238, transmit processor 220, and TX MIMO processor 230.

Specifically, method 300 includes, at block 302, identifying, by a processor, a first search space configuration for a first search space. For example, eNB 105 may, under control of controller/processor 240, identify a first search space configuration for a first search space. In one aspect of the disclosure, the first search space may include one or more locations where unicast control information may be retrieved by a mobile device. For example, a search space may refer to a set of control channel element (CCE) locations or enhanced CCE (ECCE) locations where a UE may find its physical downlink control channel (PDCCH), enhanced PDCCH (EPDCCH), or enhanced MTC (eMTC) PDCCH (MPDCCH), and, in particular, downlink control information (DCI) in the PDCCH. In one aspect of the disclosure, the first search space may be a UE-specific search space. A UE-specific search space may be a search space where a base station provides control information that is capable of being decoded by only the UE for which the control information was intended. Thus, the control information in the first search space may be termed unicast control information because the control information in the first search space may be used to effectuate unicast communication between the base station and the UE. In some aspects of the disclosure, control information transmitted in the first search space may include at least one of transmitter power control (TPC) information and an acknowledgement, or negative acknowledgement, indicating whether a message was received correctly or in error.

In one aspect of the disclosure, the first search space may be pre-established, such as by a specification. Accordingly, a base station may, for example under control of controller/ processor 240, identify the first search space by identifying the pre-established search space to be used to communicate UE-specific control information. Similarly, a UE may identify, for example under control of controller/processor 280, the first search space by identifying the pre-established search space which is being used to communicate UE-specific control information. In some aspects, the base station may, for example under control of controller/processor 240 and/or wireless radios 1000*a-t* and/or antennas 234*a-t*, inform the UE of the first search space configuration. Thus, identifying the first search space by the UE may include receiving, for example under control of controller/processor 280 and/or wireless radios 1100*a-r* and/or antennas 252*a-r*, a message from the base station that specifies the first search space.

At block 304, method 300 includes setting, by the processor, a second search space configuration for a second search space based, at least in part, on the first search space configuration. For example, eNB 105 may, under control of controller/processor 240 and/or wireless radios 1000*a-t*, set a second search space configuration for a second search space based, at least in part, on the first search space configuration. In one aspect of the disclosure, the second search space may include one or more locations where control information for more than one mobile device may be retrieved by the mobile device. In one aspect of the disclosure, the second search space may be a search space common for a plurality of UEs, i.e., the common search space may not be specific to a particular UE. A common search space may be a search space where a base station provides control information that is capable of being decoded by many UEs rather than being capable of decoding by only the UE for which the control information was intended. Thus, the control information in the second search space may be termed broadcast control information because the control information in the second search space may be used to effectuate broadcast communication between the base station and a plurality of UEs. In some embodiments, control information transmitted in the second search space may include at least one of TPC information and ACK/NACK information. In some aspects of the disclosure, the common search space may be used as a fallback search space when information is not available or not decodable by the UE in the UE-specific search space. In some aspects of the disclosure the common search space may be configured with a larger repetition level than the UE-specific search space, such that it can be used by the UE when the UE-specific search space is not decodable by the UE. In addition, the common search space may be used to provide system information, paging, or group power control.

According to an aspect of the disclosure, setting the second search space configuration based, at least in part, on the first search space configuration may include setting a frequency band for the second search space equal to a first frequency band that overlaps with a frequency band of the first search space. As an example, eNB 105 may, under control of controller/processor 240 and/or wireless radios 1000*a-t*, set a frequency band for the second search space equal to a first frequency band that overlaps with a frequency band of the first search space. For example, in one aspect of the disclosure, the first search space may include a first frequency band. To reduce power and cost, the frequency band may be a narrow frequency band. In some aspects of the disclosure, the narrow frequency band may range from as small as approximately 1 MHz to as large as approximately 30 MHz. Thus, as an illustration, and not limitation, if the first search space is set to a 1.4 MHz range of a particular frequency bandwidth, setting the second search space configuration based, at least in part, on the first search space configuration may include setting the second search space to the same 1.4 MHz range of the particular frequency bandwidth. As a result, the base station may transmit UE-specific control information, fallback control information, or control information common for a plurality of devices in the same frequency range of a particular bandwidth. To differentiate between UE-specific control information and common control information, the base station may, under control of controller/processor 240 and/or wireless radios 1000*a-t* and/or antennas 234*a-t*, code the UE-specific control information and the common control information differently and then inform a UE receiving the control information of how the UE-specific and common control information was coded so that the receiving UE can properly decode the appropriate information, where the encoding may include different aggregation or repetition level, different scrambling sequence, different number of candidates. For example, in one aspect, the first search space may include a first number of candidates and the second search space may include a second number of candidates.

Figure 4:
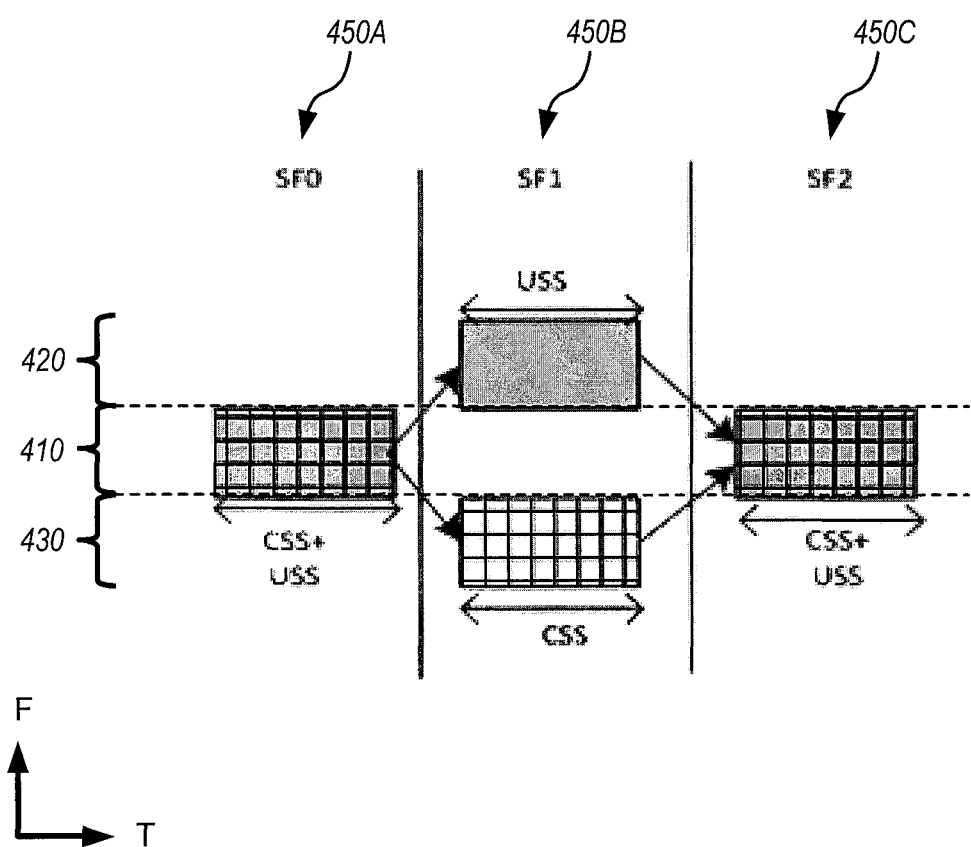
FIG. 4 shows a diagram that illustrates an example of the setting of a second search space based on a first search space according to one aspect of the present disclosure.

According to another aspect of the disclosure, setting the second search space configuration based, at least in part, on the first search space configuration may include setting, in a first transmission time interval (TTI), such as a subframe, a frequency band for the second search space equal to a first frequency band that overlaps with a frequency band of the first search space and setting, in a second TTI, the frequency band for the second search space equal to a second frequency band that does not overlap with the frequency band of the first search space. As an example, eNB 105 may, under control of controller/processor 240 and/or wireless radios 1000*a-t*, set, in a first TTI, a frequency band for the second search space equal to a first frequency band that overlaps with a frequency band of the first search space and set, in a second TTI, the frequency band for the second search space equal to a second frequency band that does not overlap with the frequency band of the first search space. To illustrate, FIG. 4 provides a diagram that illustrates an example of the setting of the second search space based on the first search space according to one aspect of the present disclosure. Three different TTIs 450 are illustrated in FIG. 4. Each TTI occupies a distinct time interval. In other words, no two TTIs overlap in time.

In the aspect of the disclosure illustrated in FIG. 4, transmission of the UE-specific control information in the UE-specific search space (USS) and transmission of the common control information in the common search space (CSS) may include hopped transmission. The UE-specific control information and the common control information may be coded differently. Therefore, the UE-specific control information and the common control information may have distinct data patterns. In TTI 450A, the UE-specific control information and the common control information, both of which may be coded differently, may be in the same narrow frequency band 410. In TTI 450B, the UE-specific control information may be in narrow frequency band 420 and the common control information may be in narrow frequency band 430. In TTI 450C, the UE-specific control information and the common control information may again be in the same narrow frequency band 410. Therefore, a base station implementing hopped transmission to transmit UE-specific control information and common control information may transmit both in the same frequency band in a first TTI so that the USS and the CSS overlap. Then the base station may transmit both in different frequency bands in a second TTI so that the USS and the CSS do not overlap. In subsequent TTIs, the UE-specific control information and common control information may be included in the same or a different frequency band similar to as was done in the first or second TTI. In some cases, a UE may decode the CSS only when USS and CSS overlap in the same frequency band.

According to another aspect of the disclosure, setting the second search space configuration based, at least in part, on the first search space configuration may include setting the second search space based on parameters that do not include a parameter that was used to set the first search space. As an example, eNB 105 may, under control of controller/processor 240 and/or wireless radios 1000*a*-*t*, set the second search space based on parameters that do not include a parameter that was used to set the first search space. In other words, the use of a parameter that was used to set the first search space may be avoided when setting the second search space. For example, in one aspect of the disclosure, the first search space may include candidates that were set based on an identifier of the mobile device, such as a cell radio network temporary identifier (C-RNTI) which may be stored in memory 242. However, candidates of the second search space may be set based on parameters that do not include the identifier of the mobile device. In other words, the base station may avoid using the C-RNTI when setting the second search space.

At block 306, method 300 includes transmitting, by the processor, control information to the mobile device in at least one of the first search space and the second search space. As an example, eNB 105 may, under control of controller/processor 240 and/or wireless radios 1000*a*-*t* and/or antennas 234*a*-*t*, transmit control information to the mobile device in at least one of the first search space and the second search space. For example, in one embodiment, the base station may transmit UE-specific control information and common control information in the same frequency band in a particular bandwidth when the frequency band for the second search space is set to overlap with the frequency band of the first search space in a particular bandwidth. In another aspect, the base station may transmit the UE-specific control information and the common control information in a hopped manner, as discussed above and with reference to FIG. 4. In yet another aspect, the base station may transmit UE-specific control information in a first search space and common control information in a second search space that the base station set while avoiding the use of a UE identifier as disclosed above. In some aspects of the disclosure, transmitting, such as at block 306, may include transmitting at least one of a grant for uplink transmission, a grant for downlink transmission, a fallback grant that includes fallback control information, TPC information, and an acknowledgement, or negative acknowledgement, indicating whether a message was received correctly or in error. In another aspect of the disclosure, transmitting, such as at block 306, may include transmitting, in the first search space, control information associated with a first transmission mode, and transmitting, in the second search space, control information associated with a second transmission mode.

In some aspects of the disclosure, a UE may be configured to determine the first and second search spaces used for transmission of UE-specific control information and common control information, respectively, and to receive the transmitted UE-specific control information and common control information. For example, UE 115 may, under control of controller/processor 280 and/or wireless radios 1100*a*-*r* and/or antennas 252*a*-*r*, determine and identify the first and second search spaces used for transmission of UE-specific control information and common control information, respectively, and receive the transmitted UE-specific control information and common control information. In particular, a UE may be configured to identify a first search space configuration for a first search space. For example, in one embodiment, a UE may receive from a base station the configuration information for the first search space. Accordingly, the UE may identify the first search space based on the information received from the base station.

After receiving the first search space configuration information, the UE may be configured to determine the second search space configuration based, at least in part, on the first search space configuration. As an example, UE 115 may, under control of controller/processor 280 and/or wireless radios 1100*a*-*r* and/or antennas 252*a*-*r*, determine the second search space configuration based, at least in part, on the first search space configuration. For example, in one aspect, the UE may be configured to determine that the second search space was established by setting a frequency band for the second search space equal to a first frequency band that overlaps with a frequency band of the first search space. In another aspect, the UE may be configured to determine that, in a first TTI, a frequency band for the second search space was set equal to a first frequency band that overlaps with a frequency band of the first search space and that, in a second TTI, the frequency band for the second search space was set equal to a second frequency band that does not overlap with the frequency band of the first search space. In yet another aspect, the UE may be configured to determine that the first search space includes candidates that were set based on an identifier of the mobile device, and that candidates of the second search space were set based on parameters that do not include the identifier of the mobile device.

In some embodiments, the UE may determine the second search space based on information provided by the base station. As an example, UE 115 may, under control of controller/processor 280 and/or wireless radios 1100*a*-*r*, determine the second search space based on information provided by the base station. For example, the base station may inform the UE of the configuration for the second search space. In another embodiment, an agreement may be established between the base station and the UE as to how the second search space will be configured such that the base station only sends the first search space configuration information and, based on that information, the UE determines the second search space configuration. In yet another embodiment, the UE may receive a message which indicates how the second search space was configured and if the second search space configuration was set based on the first search space configuration.

After determining the second search space configuration, the UE may monitor the first and second search spaces and receive control information from the base station in at least one of the first search space and the second search space. As an example, UE 115 may, under control of controller/processor 280 and/or wireless radios 1100*a*-*r* and/or antennas 252*a*-*r*, monitor the first and second search spaces and receive control information from the base station in at least one of the first search space and the second search space. For example, in one embodiment, the UE may receive UE-specific control information and common control information in the same frequency band in a particular bandwidth when the frequency band for the second search space was set to overlap with the frequency band of the first search space in a particular bandwidth. In another aspect, the UE may receive UE-specific control information in a first search space and common control information in a second search space that the base station set while avoiding the use of a UE identifier as disclosed above.

In yet another aspect, the UE may receive the UE-specific control information and the common control information in a hopped manner, as discussed above and with reference to FIG. 4. For example, with reference to FIG. 4, in one embodiment, UE-specific control information may have priority over common control information. Thus, the UE may be configured to monitor the PDCCH for UE-specific control information in all TTIs, such as TTIs 450A, 450B, and 450C, and to monitor the PDCCH for common control information in a subset of all of the TTIs, such as TTIs 450A and 450C. In another embodiment, the common control information may have priority, such as when the base station does not transmit UE-specific control information or the UE does not receive UE-specific control information. In such a case, the UE may be configured to monitor for common control information in all TTIs, such as TTIs 450A, 450B, and 450C.

In some aspects of the disclosure, the UE may be configured to monitor the USS or the CSS based on whether or not semi-persistent scheduling (SPS) is being utilized for communication by the base station, such as under control of controller/processor 240 and/or wireless radios 1000a-t and/or antennas 234a-t and/or scheduler 244. For example, a UE may monitor only the USS when SPS is not being used, but may monitor both the USS and the CSS when SPS is being used. In addition, in order to more efficiently transmit power control information to UEs when SPS is being utilized for communication, the base station may, for example under control of controller/processor 240 and/or wireless radios 1000a-t and/or antennas 234a-t and/or scheduler 244, transmit ACK/NACK and TPC information using DCI 3/3A when SPS is being used. In some aspects of the disclosure, the bitwidth for ACK/NACK and the bitwidth for TPC can be mandated to be the same or can be configured differently.

Figure 5:
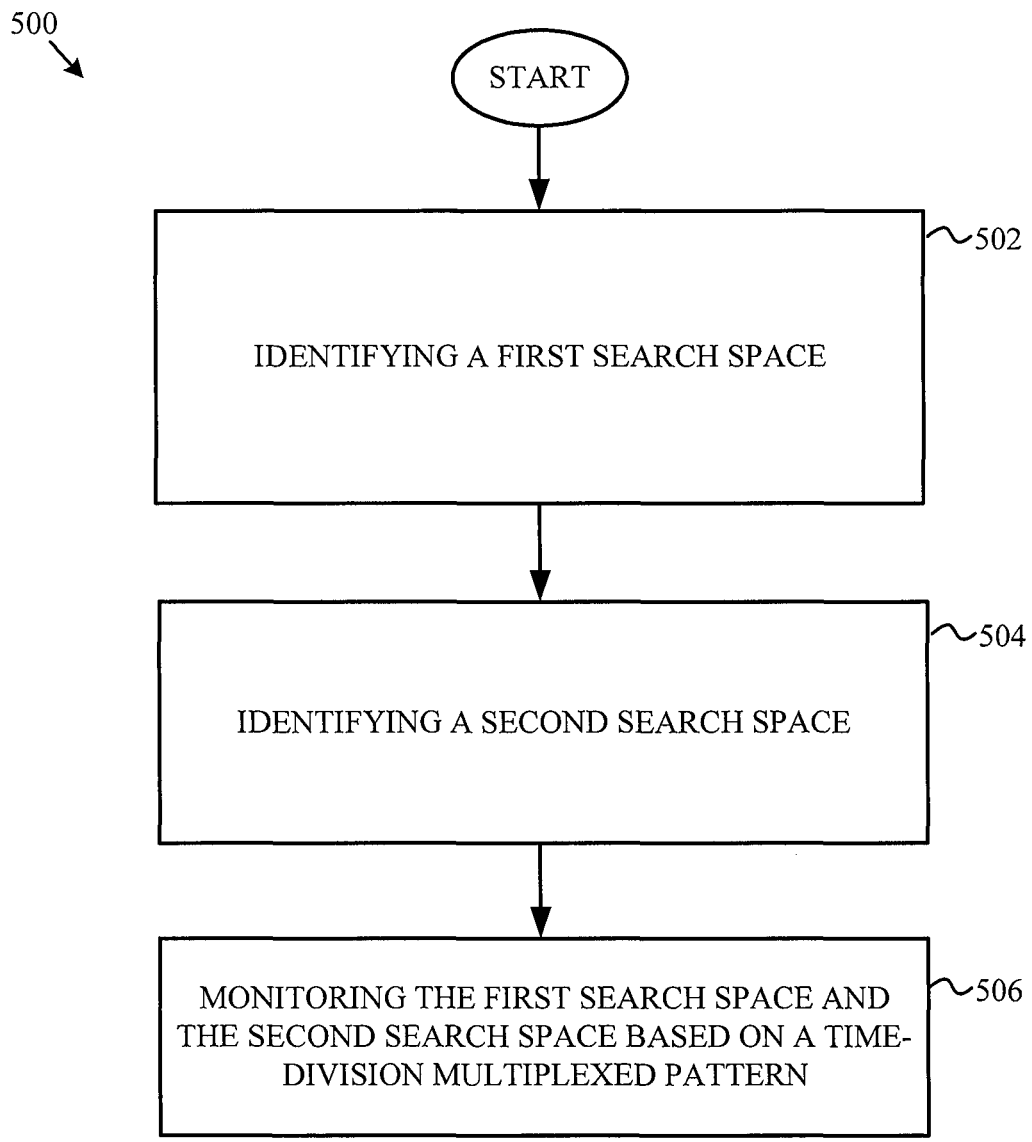
FIG. 5 is a block diagram illustrating a method for monitoring search spaces according to one aspect of the present disclosure.
Figure 9:
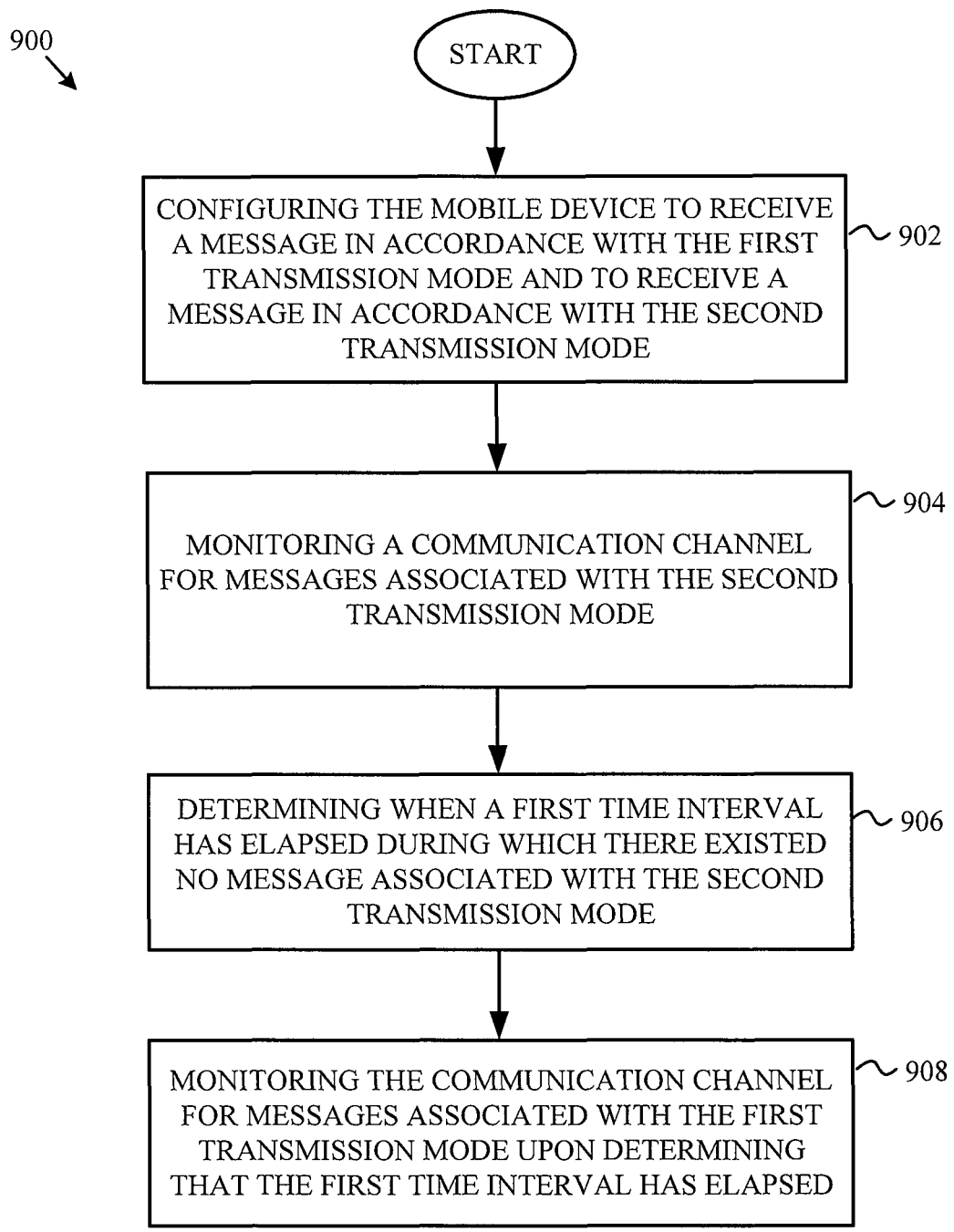
FIG. 9 is a block diagram illustrating a method for wireless communication using multiple transmission modes according to yet another aspect of the present disclosure.

FIG. 5 is a block diagram illustrating a method for monitoring search spaces according to one aspect of the present disclosure. Aspects of method 500 may be implemented with the aspects of this disclosure described with respect to FIGS. 1-2 and 10-11, such as a UE. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100a-r and antennas 252a-r. Wireless radios 1100a-r includes various components and hardware, as illustrated in FIG. 2 for UE 115, including modulator/demodulators 254a-r, MIMO detector 256, receive processor 258, transmit processor 264, and TX MIMO processor 266.

Specifically, method 500 includes, at block 502, identifying, by a processor, a first search space. For example, UE 115 may, under control of controller/processor 280, identify a first search space. In some aspects of the disclosure, the first search space may include one or more locations from where unicast control information may be retrieved. For example, as disclosed above, in one embodiment, a UE may receive, for example under control of controller/processor 280 and/or wireless radios 1100a-r and antennas 252a-r, from a base station configuration information for the first search space. Accordingly, the UE may identify the first search space based on the information received from the base station.

At block 504, method 500 includes identifying, by the processor, a second search space. For example, UE 115 may, under control of controller/processor 280, identify a second search space. In some aspects of the disclosure, the second search space may include one or more locations from where control information for more than one mobile device may be retrieved. For example, similar to the first search space, in one embodiment, a UE may receive, for example under control of controller/processor 280 and/or wireless radios 1100a-r and antennas 252a-r, from a base station configuration information for the second search space. Accordingly, the UE may identify the second search space based on the information received from the base station.

At block 506, method 500 includes monitoring, by the processor, the first search space and the second search space based on a time-division multiplexed pattern. As an example, UE 115 may, under control of controller/processor 280 and/or wireless radios 1100a-r and/or antennas 252a-r, monitor the first search space and the second search space based on a time-division multiplexed pattern. For example, in one aspect, the USS and the CSS may occupy different non-overlapping narrow frequency bands of a particular communication bandwidth, and monitoring of the first search space and the second search space may be based on a time-division multiplexed pattern. However, even in aspects of the disclosure in which the USS and the CSS occupy the same overlapping frequency band of a particular communication bandwidth, as disclosed herein with respect to FIGS. 3 and 4, monitoring of the first search space and the second search space may be based on a time-division multiplexed pattern.

According to one aspect of the disclosure, monitoring may include a UE, for example under control of controller/processor 280 and/or wireless radios 1100a-r and/or antennas 252a-r, monitoring the first search space for unicast control information in the first search space that the processor is capable of decoding, determining when a first time interval has elapsed during which there existed no unicast control information in the first search space that the processor is capable of decoding, and monitoring the second search space upon determining that the first time interval has elapsed. In some cases, monitoring may include determining a signal to noise ratio (SNR) value, and monitoring the first search space and/or the second search space based on the SNR determination. For example, in one aspect, the first search space may be monitored upon determining that the SNR value exceeds a threshold, and the second search space may be monitored upon determining that the SNR value does not exceed a threshold, or vice versa. In some aspects, such as when the USS takes priority over the CSS, the UE may be configured to monitor the USS, i.e., the first search space, regardless of whether there is control information in the CSS, i.e., the second search space. However, the UE may keep track of how much time has passed since the last time UE-specific control information was provided in the USS. In addition, the UE may compare the time with a threshold, which may be pre-defined, user-provided, or automatically generated dynamically. The threshold may represent the maximum amount of the time the UE may monitor the USS before transitioning to monitoring of the CSS. Thus, when the UE determines that the time since the last time UE-specific control information, such as unicast control information, such that the processor is capable of decoding, was provided in the USS has exceeded the threshold, the UE may transition to monitoring of the CSS for common control information. In one aspect, the CSS may be monitored when the SNR is determined to be below a threshold, and the USS may be monitored when the SNR is determined to be above a threshold. In another aspect, the CSS may serve as a fallback search space to be searched when UE-specific control information is not received, for example, as a result of faulty encoding or errors in transmission or reception.

In another aspect of the disclosure, monitoring the first search space and the second search space based on a time-division multiplexed pattern may include configuring the UE to monitor the CSS for common control information in the first TTI of every radio frame and monitor the USS for UE-specific control information in the remainder of the TTIs of every radio frame. As an example, UE 115 may, under control of controller/processor 280 and/or wireless radios 1100a-r and/or antennas 252a-r, configure itself to monitor the CSS for common control information in the first TTI of every radio frame and monitor the USS for UE-specific control information in the remainder of the TTIs of every radio frame. According to another aspect of the disclosure, monitoring may also include monitoring the USS for UE-specific control information in every TTI and monitoring the CSS for common control information in every Nth TTI, such as every $3^{rd}$ TTI, or every $5^{th}$ TTI.

According to another aspect of the disclosure, a UE may monitor a communication channel for a first type of information (for example DCI 1A) in the common search space, CSS, and for a second type of information (for example DCI 1B, or the equivalent in other transmission modes) in the UE-specific search space, USS. When the UE is not configured to monitor an additional transmission mode, then the first type of information may be the same as the second type of information. In addition, in another aspect of the disclosure, a UE may monitor the common search space for control information associated with a first transmission mode and may monitor the UE-specific search space for control information associated with a second transmission mode.

Figure 6:
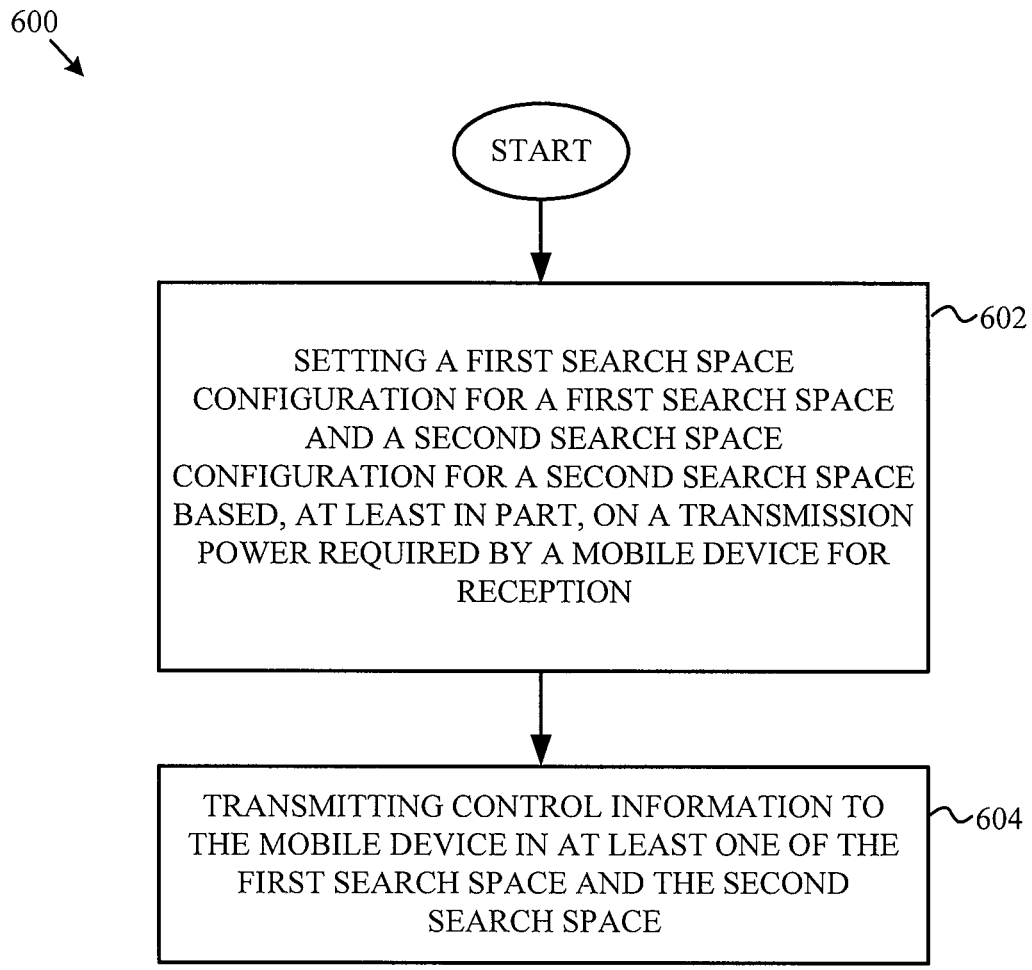
FIG. 6 is a block diagram illustrating a method for setting search spaces according to one aspect of the present disclosure.

FIG. 6 is a block diagram illustrating a method for setting search spaces according to one aspect of the present disclosure. Aspects of method 600 may be implemented with the aspects of this disclosure described with respect to FIGS. 1-2 and 10-11, such as a base station. The example blocks will also be described with respect to eNB 105 as illustrated in FIG. 10.

Specifically, method 600 includes, at block 602, setting, by a processor, a first search space configuration for a first search space and a second search space configuration for a second search space based, at least in part, on a transmission power required by a mobile device for reception, wherein the first search space comprises one or more locations where unicast control information may be retrieved by the mobile device, and wherein the second search space comprises one or more locations where control information for more than one mobile device may be retrieved by the mobile device. As an example, eNB 105 may, under control of controller/processor 240 and/or wireless radios 1000a-t and/or antennas 234a-t, set a first search space configuration for a first search space and a second search space configuration for a second search space based, at least in part, on a transmission power required by a mobile device for reception. For example, different UEs capable of communicating with a base station may require different repetition/aggregation levels for communications from the base station. For example, one UE capable of communicating with a base station may be a UE located deep in a basement of a residence or behind layers of concrete of a building, such as a utility meter. Such a UE may have a repetition/aggregation level defined as R={2, 4, 8}, where 2, 4, and 8 specify the repetition/aggregation level required based on the properties of the communication from a base station. R={2, 4, 8} signifies that, at a minimum, the UE requires at least a repetition level of 2 and that the maximum repetition level that may be required for the UE is 8. In other words, a repetition level of 2 means that the communication must be transmitted 2 times, and a repetition level of N means that the communication must be transmitted N times. Another UE may have less demanding repetition levels, for example, because the UE is not blocked by layers of material, and thus may have a repetition level defined as R={1, 2, 4}. Accordingly, as indicated at block 602, the base station may set a first search space configuration for a first search space and a second search space configuration for a second search space based, at least in part, on the repetition levels associated with a mobile device, i.e., a transmission power required by a mobile device for reception. In some aspects of the disclosure, the repetition level may be referred to as a bundle size to associate with communication.

In particular, in one aspect, a base station may include in its cell three UEs, with UE1 having a repetition level defined by R1={1, 2, 4}, UE2 having a repetition level defined by R2={2, 4, 8}, and UE3 having a repetition level defined by R3={1, 2, 4}. According to one aspect, the base station may associate the USS with the repetition level associated with the UE for which the UE-specific control information in the USS is intended. For example, in setting a USS for UE1, the base station may associate the USS with a repetition level defined as R1={1, 2, 4} because only UE1 is the intended recipient of the communication that includes the UE-specific control information. However, the base station may associate the CSS with a repetition level equal to the worst-case repetition level associated with any UE in the group of UEs for which common control information in the CSS is intended. For example, in setting a CSS for UE1, UE2, and UE3, the base station may associate the CSS with a repetition level defined as R={2, 4, 8}, i.e., the same repetition level R2 associated with UE2, because UE1, UE2, and UE3 may all be the intended recipients of the communication that includes the common control information and to ensure that all the UEs receive the communication, the base station must make sure that the worst case communication requirement is met, which is set by UE2.

According to another aspect of the disclosure, a base station may group UEs based on their associated repetition levels to avoid unnecessary repetition when not necessary. For example, in the example given above that includes UE1, UE2, and UE3, the base station may group UE1 and UE2 because their repetition levels are the same. Accordingly, when setting the CSS for UE1 and UE2, the base station may associate the CSS with a repetition level defined as R={1, 2, 4} because neither UE1 nor UE2 requires a repetition level greater than 4.

According to another aspect of the disclosure, a base station may configure the CSS for a UE with a larger repetition level than that necessary for the UE. For example, UE1 can be configured with repetition level R={1,2,4} for USS and R={2,4,8} for the CSS. This larger repetition level may be monitored by the UE in fallback mode, for example, after detecting a drop in SNR level.

In some aspects of the disclosure, the bundle size configuration, i.e., the repetition/aggregation level, may be obtained by the UE in different ways. For example, for the bundle size configuration associated with the UE-specific search space, the bundle size configuration may be obtained via Radio Resource Control (RRC) signaling. For the bundle size configuration associated with the common search space, the bundle size configuration may be obtained via RRC signaling, which may be different than the bundle size configuration for the UE-specific search space. In other words, a UE may receive a separate RRC configuration for the common search space. The bundle size configuration may also be obtained for CSS by setting it to the same value as the bundle size for the USS. In another aspect of the disclosure, the bundle size configuration may be obtained by broadcast messages.

At block 604, method 600 includes transmitting, by the processor, control information to the mobile device in at least one of the first search space and the second search space. For example, eNB 105 may, under control of controller/processor 240 and/or wireless radios 1000*a-t* and/or antennas 234*a-t*, transmit control information to the mobile device in at least one of the first search space and the second search space. In some aspects, transmission may include retransmission of the control information in the USS or the CSS based on the repetition level associated with the USS or the CSS. Thus, the base station may be configured to retransmit, a first number of times, control information to the mobile device in the first search space, i.e., the USS, wherein the first number of times to retransmit is determined based on the transmission power required for reception by the mobile device, i.e., the repetition level associated with the mobile device. In addition, the base station may be configured to retransmit, a second number of times, control information to the mobile device in the second search space, i.e., the CSS, wherein the second number of times to retransmit is determined based on the transmission power required for reception by multiple mobile devices, and wherein the second number of times is different than the first number of times. For example, as discussed above, the transmission power required for reception by multiple mobile devices may be the worst case repetition level required by any device which is an intended recipient of the common control information in the CSS.

Similarly, a UE may be configured to receive a USS associated with a first repetition level and receive a CSS associated with a second repetition level. As an example, UE 115 may, under control of controller/processor 280 and/or wireless radios 1100*a-r* and/or antennas 252*a-r*, receive a USS associated with a first repetition level and receive a CSS associated with a second repetition level. For example, a UE may receive control information in a USS, where the control information in the USS has been retransmitted a first number of times determined based on the transmission power required for reception by the UE, i.e., the repetition level associated with the UE. In addition, the UE may receive control information in a CSS, where the control information in the CSS has been retransmitted a second number of times determined based on the transmission power required for reception by multiple UEs, such as the worst case repetition level required by any device which is an intended recipient of the common control information in the CSS.

In some embodiments, the base station may, for example under control of controller/processor 240 and/or wireless radios 1000*a-t* and/or antennas 234*a-t*, inform the UE of the repetition levels associated with the USS and the CSS. In another embodiment, the UE may, for example under control of controller/processor 280 and/or wireless radios 1100*a-r* and/or antennas 252*a-r*, determine the repetition level associated with the USS and the CSS based on information received in a message from the base station or information processed by the UE at the UE.

In some embodiments, the method of wireless communication, such as method 300, 500, or 600, utilized by the UE and base station may be determined based on bundle size, i.e., the repetition level associated with communication. For example, when little, such as $R<=4$, or no repetition level is required, i.e., minimal bundling is required, the communication utilized by the base station and the UE may most closely align with the communication disclosed in method 300. However, when a large amount of repetition, such as $R>=4$, is required, i.e., large bundling is required, the communication utilized by the base station and the UE may most closely align with the communication disclosed in method 500.

Figure 7:
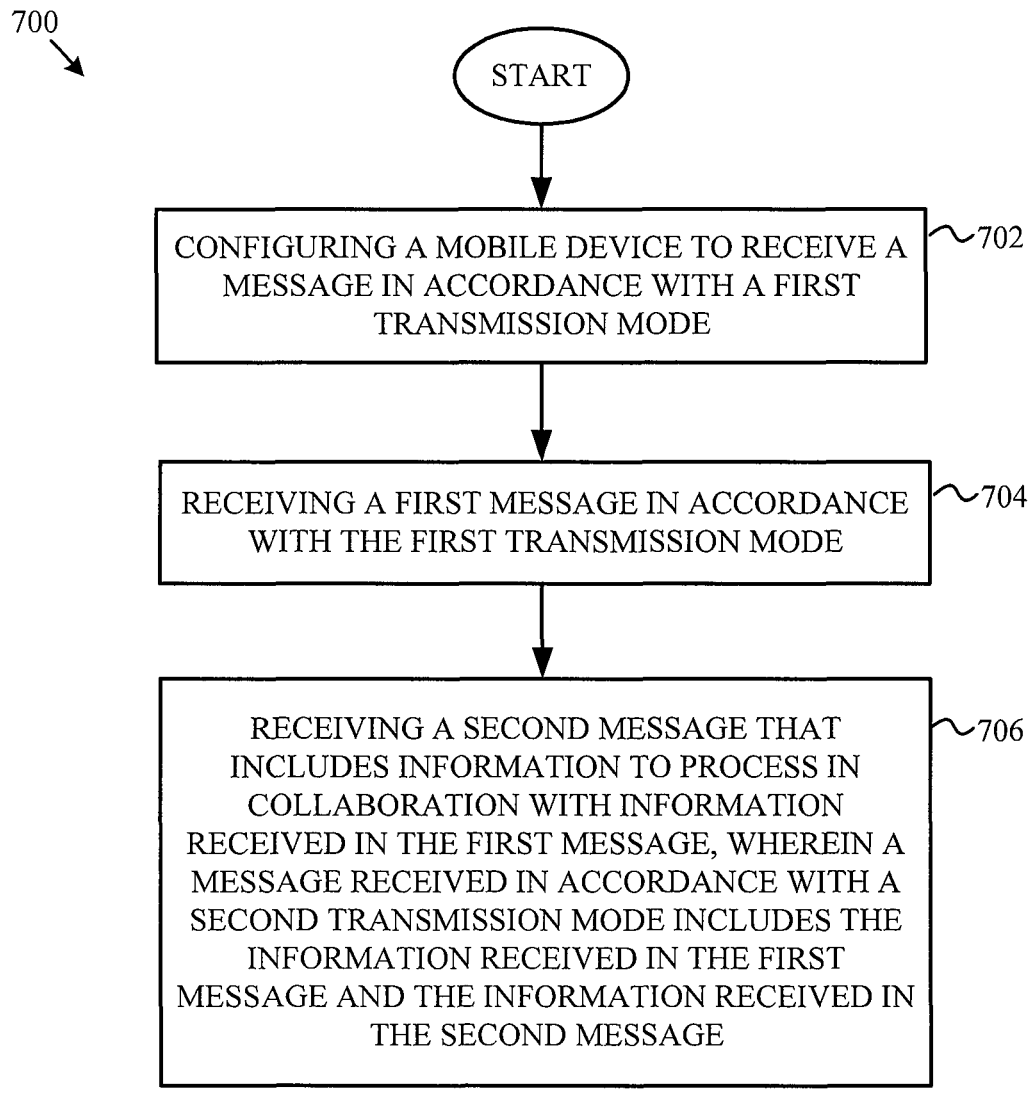
FIG. 7 is a block diagram illustrating a method for wireless communication using multiple transmission modes according to one aspect of the present disclosure.
Figure 11:
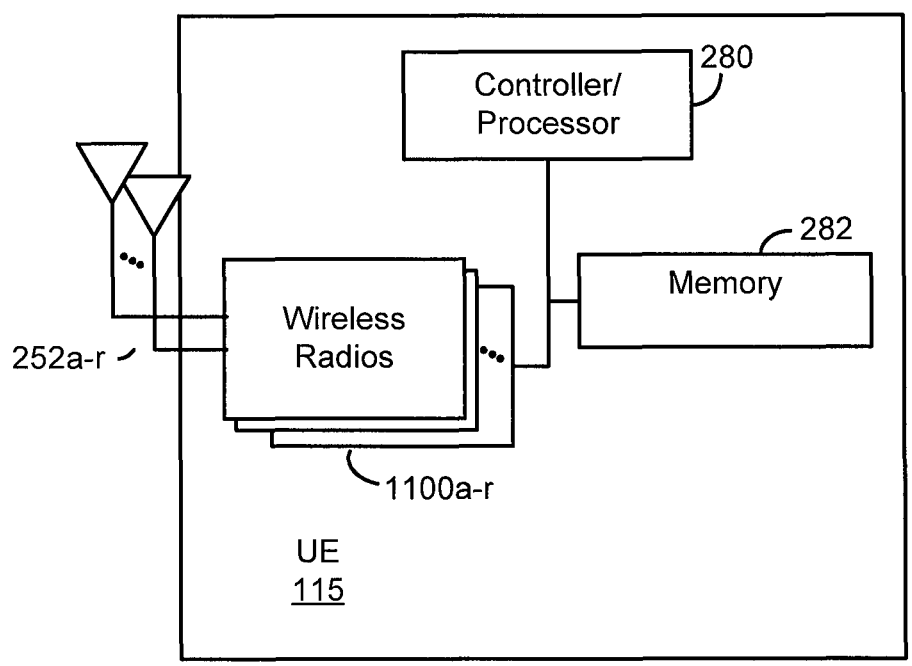
FIG. 11 is a block diagram illustrating a UE configured according to one aspect of the present disclosure.

FIG. 7 is a block diagram illustrating a method for wireless communication using multiple transmission modes according to one aspect of the present disclosure. Aspects of method 700 may be implemented with the aspects of this disclosure described with respect to FIGS. 1-2 and 10-11, such as a UE. The example blocks will also be described with respect to UE 115 as illustrated in FIG. 11.

Communication between a base station and a UE may be effectuated using different transmission modes, such as Single Transmission Antenna and Single Receiver Antenna (SISO), diversity transmission, Multiple Transmission Antenna and Multiple Receiver Antenna (MIMO), and the like. Because different information may be needed by a UE to communicate in a particular transmission mode, the size of the grant, i.e., the message in PDCCH that includes the control information, may be different when configuring a UE to operate in one transmission or another. In other words, the size of the grant may vary depending on the information that needs to be sent in the grant regarding the transmission mode. For example, a grant providing information regarding a first transmission mode may have a size of N bits. However, a grant providing information regarding a second transmission mode may have a size of M bits, which may be larger than N. Accordingly, FIG. 7 provides a block diagram illustrating a method for wireless communication using multiple transmission modes according to one aspect of the present disclosure.

Specifically, method 700 includes, at block 702, configuring a mobile device to receive a message in accordance with a first transmission mode. As an example, UE 115 may, under control of controller/processor 280 and/or wireless radios 1100*a-r* and/or antennas 252*a-r*, configure itself to receive a message in accordance with a first transmission mode. For example, a mobile device may be configured to receive a message, i.e., a grant, providing information regarding a first transmission mode, such as transmission mode TM1. By configuring the mobile device to receive grants providing information regarding TM1 the mobile device may be configured to receive grants of size N. Accordingly, configuring the mobile device to receive a grant with information regarding the first transmission mode may also configure the mobile device to receive grants with information regarding other transmission modes for which their associated grants are also of size N. In other words, once a mobile device is configured to receive grants of a particular size, such as N, the mobile device may be configured to receive grants associated with any transmission mode so long as the grants are of the same size N.

At block 704, method 700 includes receiving a first message in accordance with the first transmission mode. As an example, UE 115 may, under control of controller/processor 280 and/or wireless radios 1100a-r and/or antennas 252a-r, receive a first message in accordance with the first transmission mode. For example, a mobile device may be configured to receive a grant of size N which provides information regarding the first transmission mode.

At block 706, method 700 includes receiving a second message in accordance with a second transmission mode and that includes information to process in collaboration with information received in the first message, wherein a message received in accordance with a second transmission mode includes the information received in the first message and the information received in the second message. As an example, UE 115 may, under control of controller/processor 280 and/or wireless radios 1100a-r and/or antennas 252a-r, receive a second message that includes information to process in collaboration with information received in the first message. For example, a message received in accordance with a second transmission mode may be a grant which provides information regarding a transmission mode different than the first transmission mode and has a size that is different than the grant of size N which provides information regarding the first transmission mode. For example, the grant which provides information regarding a transmission mode different than the first transmission mode may have a size M, which may be larger than N. As noted at block 706, the grant associated with the second transmission mode may normally include the information received in the first message and the information received in the second message. Thus, a mobile device configured to receive grants associated with second transmission mode would receive a grant having a size M and including the information received in the first message and the information received in the second message all within the grant message. However, because, as noted at block 702, the mobile device is configured to receive grants in accordance with the first transmission mode, the mobile device cannot properly receive the grant associated with the second transmission mode because it is not configured to read grants that large. Accordingly, in order for a mobile device configured to receive grants in accordance with the first transmission mode, such as at block 702, to receive all the information that would have been received in a grant associated with the second transmission mode, the mobile device receives a grant in accordance with the first transmission mode, such as at block 704, and then receives the remainder of the information that would have been included in the grant associated with the second transmission mode in the second message, such as at block 706. Accordingly, the information in the grant received at block 704 and the information in the second message may make up all the information that would have been included in a grant associated with the second transmission mode such that when the information received in the second message is processed in collaboration with the information received in the first message, the mobile device is essentially processing information that would have been received entirely within a grant associated with the second transmission mode.

By obtaining the additional information that would be required for operation in the second transmission mode via a second message, the mobile device is able to maintain its original configuration, i.e., its configuration to receive grants associated with the first transmission mode and having original size N. When the mobile device needs to configure itself to operate in the second transmission mode, the additional information is not included in the grants it receives because the grants cannot contain the additional information and because the mobile device is not configured to receive larger grants. Instead the additional information is received via a second message, such as at block 706. For example, when the second transmission mode is transmission mode 6 (TM6), additional information that would need to have been included in a grant associated with the first transmission mode, such as transmission mode 1 or 2 (TM1 or TM2), may include Transmitted Precoding Matrix Indicator (TPMI) or Precoding Matrix Indicator (PMI) information regarding a precoding matrix the UE is to use for decoding received data. Thus, in one aspect of the disclosure, the UE may receive the TPMI/PMI information in the second message. For example, the second message may inform the UE to use the last reported PMI to obtain its precoding matrix. The second message may be a separate message received by the UE from the base station, or a message generated by the UE based on processing of information received by the UE. In addition, the UE may monitor for fallback grant (M1A), and additionally monitor for the other grant.

In another aspect of the disclosure, the information in the second message may include information which informs the mobile device of where the mobile device may receive information regarding the precoding matrix to use for decoding data. For example, the second message may inform the UE that the information regarding the precoding matrix cycles across TTIs, such as, for example, informing the UE that precoder 1 will be in TTI 1, precoder 2 will be in TTI 2, precoder 3 will be in TTI 3, and so on.

When the second transmission mode is transmission mode 9 (TM9), additional information that would need to have been included in a grant associated with the first transmission mode, such as transmission mode 1 or 2 (TM1 or TM2), may include scrambling sequence information. Thus, in one aspect of the disclosure, the UE may receive the scrambling sequence information in the second message. For example, the second message may specify a scrambling sequence to use. The second message may be a separate message received by the UE from the base station, or a message generated by the UE based on processing of information received by the UE. In another aspect of the disclosure, the information in the second message may include information which informs the mobile device of where the mobile device may receive information regarding the scrambling sequence to use, such as where in a radio frame the information may be located or provided by the base station.

In another aspect of the disclosure, one that is similar to the aspect of the disclosure illustrated in FIG. 7, a base station may be configured to transmit a first message in accordance with a first transmission mode and to transmit a second message in accordance with a second transmission mode, wherein the second message includes information to process in collaboration with information in the first message, and wherein the second message includes the information in the first message. For example, eNB 105 may, under control of controller/processor 240 and/or wireless radios 1000a-t and/or antennas 234a-t, transmit a first message in accordance with a first transmission mode and to transmit a second message in accordance with a second transmission mode, wherein the second message includes information to process in collaboration with information in the first message, and wherein the second message includes the information in the first message.

Figure 8:
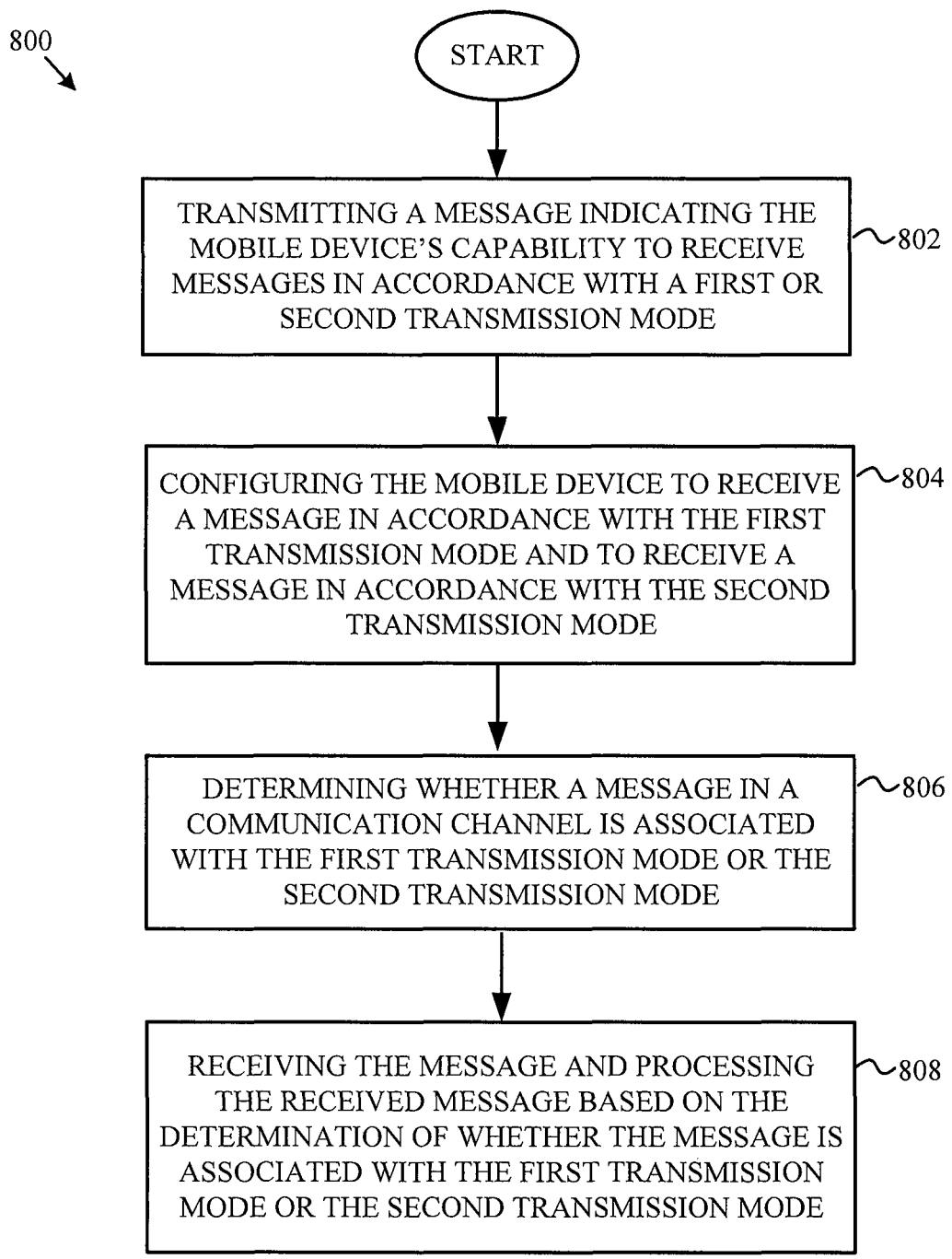
FIG. 8 is a block diagram illustrating a method for wireless communication using multiple transmission modes according to another aspect of the present disclosure.

FIG. 8 is a block diagram illustrating a method for wireless communication using multiple transmission modes according to another aspect of the present disclosure. Aspects of method 800 may be implemented with the aspects of this disclosure described with respect to FIGS. 1-2 and 10-11, such as a UE. The example blocks will also be described with respect to UE 115 as illustrated in FIG. 11.

Specifically, method 800 includes, at block 802, transmitting, by a mobile device, a message indicating the mobile device's capability to receive messages in accordance with a first or second transmission mode. As an example, UE 115 may, under control of controller/processor 280 and/or wireless radios 1100a-r and/or antennas 252a-r, transmit a message indicating the mobile device's capability to receive messages in accordance with a first or second transmission mode. For example, the UE may transmit a message to the base station indicating that it is capable of receiving a grant in accordance with other transmission modes, such as TM6 or TM9, in addition to being capable of receiving grants in accordance with a first transmission mode, such as TM1 or TM2.

At block 804, method 800 includes configuring the mobile device to receive a message in accordance with the first transmission mode and to receive a message in accordance with the second transmission mode. As an example, UE 115 may, under control of controller/processor 280 and/or wireless radios 1100a-r and/or antennas 252a-r, configure itself to receive a message in accordance with the first transmission mode and to receive a message in accordance with the second transmission mode. For example, the UE may be configured to receive grants providing information regarding a first transmission mode, such as TM1, and a second transmission mode, such as TM6.

At block 806, method 800 includes determining whether a message in a communication channel is associated with the first transmission mode or the second transmission mode. As an example, UE 115 may, under control of controller/processor 280 and/or wireless radios 1100a-r and/or antennas 252a-r, determine whether a message in a communication channel is associated with the first transmission mode or the second transmission mode. For example, the UE may identify that a grant is being provided to the UE in a communication channel and determine, for example, based on the size of the grant, whether the grant is associated with the first or second transmission mode.

At block 808, method 800 includes receiving the message and processing the received message based on the determination of whether the message is associated with the first transmission mode or the second transmission mode. As an example, UE 115 may, under control of controller/processor 280 and/or wireless radios 1100a-r and/or antennas 252a-r, receive the message and process the received message based on the determination of whether the message is associated with the first transmission mode or the second transmission mode. For example, if the grant was associated with a first transmission mode, such as TM1, having a size of N bits, then the mobile device will process the N bits of the grant. However, if the grant was associated with a second transmission mode, such as TM6, having a size of M bits which is larger than N, then the mobile device will process the M bits of the grant. Accordingly, the mobile device is capable of reconfiguring itself to receive and process grants based on the specific properties of the grants.

FIG. 9 is a block diagram illustrating a method for wireless communication using multiple transmission modes according to yet another aspect of the present disclosure. Aspects of method 900 may be implemented with the aspects of this disclosure described with respect to FIGS. 1-2 and 10-11, such as a UE. The example blocks will also be described with respect to UE 115 as illustrated in FIG. 11.

Specifically, method 900 includes, at block 902, configuring the mobile device to receive a message in accordance with the first transmission mode and to receive a message in accordance with the second transmission mode. As an example, UE 115 may, under control of controller/processor 280 and/or wireless radios 1100a-r and/or antennas 252a-r, configure itself to receive a message in accordance with the first transmission mode and to receive a message in accordance with the second transmission mode. For example, the UE may be configured to receive grants providing information regarding a first transmission mode, such as TM1, and a second transmission mode, such as TM6.

At block 904, method 900 includes monitoring a communication channel for messages associated with the second transmission mode. As an example, UE 115 may, under control of controller/processor 280 and/or wireless radios 1100a-r and/or antennas 252a-r, monitor a communication channel for messages associated with the second transmission mode. For example, the UE may monitor a communication channel for grants associated with a second transmission mode, such as TM6 or TM9. At block 906, method 900 includes determining when a first time interval has elapsed during which there existed no message associated with the second transmission mode. As an example, UE 115 may, under control of controller/processor 280 and/or wireless radios 1100a-r and/or antennas 252a-r, determine when a first time interval has elapsed during which there existed no message associated with the second transmission mode. At block 908, method 900 includes monitoring the communication channel for messages associated with the first transmission mode upon determining that the first time interval has elapsed. As an example, UE 115 may, under control of controller/processor 280 and/or wireless radios 1100a-r and/or antennas 252a-r, monitor the communication channel for messages associated with the first transmission mode upon determining that the first time interval has elapsed. For example, in some aspects, larger grants, such as those associated with TM6 or TM9, may be given priority over smaller grants, thus the UE may be configured to monitor for larger grants first. However, the UE may keep track of how much time has passed since the last time a grant associated with second transmission mode was provided in the communication channel. In addition, the UE may compare the time with a threshold, which may be pre-defined, user-provided, or automatically generated dynamically. The threshold may represent the maximum amount of the time the UE may monitor the communication channel for a grant associated with a second transmission mode before transitioning to monitoring the communication for a grant associated with the first transmission mode, such as TM1 or TM2. Thus, when the UE determines that the time since the last time a grant associated with second transmission mode was provided in the communication channel has exceeded the threshold, the UE may transition to monitoring of the communication channel for grants associated with the first transmission mode.

In some aspects of the disclosure, monitoring may also be dependent on the SNR. For example, monitoring may include determining a signal to noise ratio (SNR) value, monitoring a communication channel for messages associated with the first transmission mode upon determining that the SNR value exceeds a threshold, and monitoring the communication channel for messages associated with the second transmission mode upon determining that the SNR value does not exceed a threshold. In other aspects of the disclosure, monitoring may include determining a signal to noise ratio (SNR) value, monitoring a communication channel for messages associated with the first transmission mode upon determining that the SNR value does not exceed a threshold, and monitoring the communication channel for messages associated with the second transmission mode upon determining that the SNR value exceeds a threshold.

According to some embodiments, once the UE is configured to receive grants providing information regarding a secondary transmission mode, such as TM6 or TM9, the UE may monitor the communication channel for only grants that include the additional information required by the secondary transmission modes, such as TPMI information in the case of TM6 and scrambling information in the case of TM9. In some embodiments, even if the UE is not configured to receive grants providing information regarding a secondary transmission mode, such as TM6 or TM9, the grant transmitted by the base station and received by the UE may still include the additional bits required by the grant to include the additional information relevant to the secondary transmission modes, such as TM6 or TM9, but not a transmission mode being associated with a smaller grant, such as TM1 or TM2.

In some embodiments, the UE may change the method for wireless communication using multiple transmission modes, such as method 700, 800, or 900, based on coverage requirements, such as the repetition levels associated with UEs in the communication system.

In other words, the method for wireless communication may be determined based on bundle size, i.e., the repetition level associated with communication. For example, when little, such as R<=4, or no repetition level is required, i.e., minimal bundling is required, the communication utilized by the base station and the UE may be different than when a large amount of repetition, such as R>=4, is required, i.e., large bundling is required. In some aspects of the disclosure, monitoring employed by the UE may also be dependent on the coverage enhancement requirements, such as the repetition levels associated with UEs in the communication system. For example, monitoring may include determining the coverage enhancement requirement, monitoring a communication channel for messages associated with the first transmission mode upon determining that the coverage enhancement value exceeds a threshold, and monitoring the communication channel for messages associated with the second transmission mode upon determining that the coverage enhancement value does not exceed a threshold. In another embodiment, monitoring may include determining the coverage enhancement requirement, monitoring a communication channel for messages associated with the first transmission mode upon determining that the coverage enhancement value does not exceed a threshold, and monitoring the communication channel for messages associated with the second transmission mode upon determining that the coverage enhancement value exceeds a threshold. In one aspect, identification of the second search space may be based, at least in part, on the determined coverage enhancement level. Similarly, coverage enhancement levels may impact how a search space is set by a base station. For example, after a coverage enhancement level is determined, a second search space may be set based at least in part on the determined coverage enhancement level.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in the FIGS. may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by "at least one of") indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   identifying, by a processor, a first search space configuration for a first search space corresponding to a UE-specific search space (USS), wherein the first search space includes candidates that were set based on an identifier of a mobile device;
   setting, by the processor, a second search space configuration for a second search space corresponding to a common search space (CSS) based, at least in part, on the first search space configuration by setting a frequency band for the CSS equal to a first frequency band that overlaps with a frequency band previously set for the USS, wherein setting comprises setting candidates of the second search space based on parameters that do not include the identifier of the mobile device, wherein the CSS is configured with a larger repetition level than a repetition level of the USS;
   coding, by the processor, first control information to be transmitted in the USS;
   coding, by the processor, second control information to be transmitted in the CSS, wherein the second control information is coded differently from the coding of the first control information;
   transmitting, by the processor, in the USS, the first control information associated with a first transmission mode;
   transmitting, by the processor, in the CSS, the second control information associated with a second transmission mode; and
   transmitting, by the processor, an indication of the coding of the first control information and the second control information, wherein transmitting the indication of the coding of the first control information and the second control information includes:
      transmitting a first message in accordance with a third the first transmission mode including information associated with the first control information; and
      transmitting a second message in accordance with the second transmission mode including information associated with the second control information, wherein the information associated with the second control information in the second message includes information to process in collaboration with the information associated with the first control information in the in the first message, and wherein the second message includes the information associated with the first control information in the first message.

2. The method of claim 1, wherein setting includes:
   setting, in a first TTI, the frequency band for the second search space equal to the first frequency band that overlaps with the frequency band of the first search space; and
   setting, in a second TTI, the frequency band for the second search space equal to a second frequency band that does not overlap with the frequency band of the first search space.

3. The method of claim 1, wherein the first search space includes a first number of candidates and the second search space includes a second number of candidates.

4. The method of claim 1, wherein transmitting includes transmitting at least one of a grant for uplink transmission, a grant for downlink transmission, a fallback grant that includes fallback control information, transmitter power control (TPC) information, and an acknowledgement or negative acknowledgement indicating whether a message was received correctly or in error.

5. The method of claim 1, further comprising determining a coverage enhancement level, and wherein setting a second search space is based at least in part on the determined coverage enhancement level.

6. The method of claim 1, wherein the information in the second message specifies at least one of a precoding matrix to use for decoding data and a scrambling sequence to use for decoding data.

7. The method of claim 6, wherein the information in the second message includes information which informs the mobile device of where the mobile device may receive information regarding at least one of the precoding matrix and the scrambling sequence.

8. An apparatus configured for wireless communication, comprising:
   means for identifying, by a processor, a first search space configuration for a first search space corresponding to a UE-specific search space (USS), wherein the first search space includes candidates that were set based on an identifier of a mobile device;

means for setting, by the processor, a second search space configuration for a second search space corresponding to a common search space (CSS) based, at least in part, on the first search space configuration by setting a frequency band for the CSS equal to a first frequency band that overlaps with a frequency band previously set for the USS, wherein setting comprises setting candidates of the second search space based on parameters that do not include the identifier of the mobile device, wherein the CSS is configured with a larger repetition level than a repetition level of the USS;

means for coding, by the processor, first control information to be transmitted in the USS;

means for coding, by the processor, second control information to be transmitted in the CSS, wherein the second control information is coded differently from the coding of the first control information;

means for transmitting, by the processor, in the USS, the first control information associated with a first transmission mode;

means for transmitting, by the processor, in the CSS, the second control information associated with a second transmission mode; and means for transmitting, by the processor, an indication of the coding of the first control information and the second control information, wherein the means for transmitting the indication of the coding of the first control information and the second control information includes:

means for transmitting a first message in accordance with the first transmission mode including information associated with the first control information; and means for transmitting a second message in accordance with the second transmission mode including information associated with the second control information, wherein the information associated with the second control information in the second message includes information to process in collaboration with the information associated with the first control information in the in the first message, and wherein the second message includes the information associated with the first control information in the first message.

9. A non-transitory computer-readable medium having program code recorded thereon, the program code comprising:

program code for causing a computer to identify a first search space configuration for a first search space corresponding to a UE-specific search space (USS), wherein the first search space includes candidates that were set based on an identifier of a mobile device;

program code for causing the computer to set a second search space configuration for a second search space corresponding to a common search space (CSS) based, at least in part, on the first search space configuration by setting a frequency band for the CSS equal to a first frequency band that overlaps with a frequency band previously set for the USS, wherein setting comprises setting candidates of the second search space based on parameters that do not include the identifier of the mobile device, wherein the CSS is configured with a larger repetition level than a repetition level of the USS;

program code for causing the computer to code first control information to be transmitted in the USS;

program code for causing the computer to code second control information to be transmitted in the CSS, wherein the second control information is coded differently from the coding of the first control information;

program code for causing the computer to transmit, in the USS, the first control information associated with a first transmission mode;

program code for causing the computer to transmit, in the CSS, the second control information associated with a second transmission mode;

program code for causing the computer to transmit, by the processor, an indication of the coding of the first control information and the second control information, wherein the program code for causing the computer to transmit the indication of the coding of the first control information and the second control information includes:

transmit a first message in accordance with the first transmission mode including information associated with the first control information; and transmit a second message in accordance with the second transmission mode including information associated with the second control information, wherein the information associated with the second control information in the second message includes information to process in collaboration with the information associated with the first control information in the in the first message, and wherein the second message includes the information associated with the first control information in the first message.

10. An apparatus configured for wireless communication, the apparatus comprising:

at least one processor; and a memory coupled to the at least one processor, wherein the at least one processor is configured:

to identify a first search space configuration for a first search space corresponding to a UE-specific search space (USS), wherein the first search space includes candidates that were set based on an identifier of a mobile device;

to set a second search space configuration for a second search space corresponding to a common search space (CSS) based, at least in part, on the first search space configuration by setting a frequency band for the CSS equal to a first frequency band that overlaps with a frequency band previously set for the USS, wherein setting comprises setting candidates of the second search space based on parameters that do not include the identifier of the mobile device, wherein the CSS is configured with a larger repetition level than a repetition level of the USS;

to code first control information to be transmitted in the USS;

to code second control information to be transmitted in the CSS, wherein the second control information is coded differently from the coding of the first control information;

to transmit, in the USS, the first control information associated with a first transmission mode;

to transmit, in the CSS, the second control information associated with a second transmission mode; and to transmit an indication of the coding of the first control information and the second control information, wherein the processor configured to transmit the indication of the coding of the first control information and the second control information includes the processor configured:

to transmit a first message in accordance with the first transmission mode including information associated with the first control information; and to transmit a second message in accordance with the second transmission mode including information associated with the second control information, wherein the information associated with the second control information in the second message includes information to process in collaboration with the information associated with the first control information in the in the first message, and wherein the second message includes the information associated with the first control information in the first message.

11. The apparatus of claim 10, wherein the processor is further configured to:

set, in a first subframe, the frequency band for the second search space equal to the first frequency band that overlaps with the frequency band of the first search space; and set, in a second subframe, the frequency band for the second search space equal to a second frequency band that does not overlap with the frequency band of the first search space.

12. The apparatus of claim 10, wherein the first search space includes a first number of candidates and the second search space includes a second number of candidates.

13. The apparatus of claim 10, wherein the processor configured to transmit comprises the processor configured to transmit at least one of a grant for uplink transmission, a grant for downlink transmission, a fallback grant that includes fallback control information, transmitter power control (TPC) information, and an acknowledgement or negative acknowledgement indicating whether a message was received correctly or in error.

14. The apparatus of claim 10, wherein the processor is configured to determine a coverage enhancement level, and wherein setting a second search space is based at least in part on the determined coverage enhancement level.

15. The apparatus of claim 10, wherein the information in the second message specifies at least one of a precoding matrix to use for decoding data and a scrambling sequence to use for decoding data.

16. The apparatus of claim 15, wherein the information in the second message includes information which informs the mobile device of where the mobile device may receive information regarding at least one of the precoding matrix and the scrambling sequence.

* * * * *